United States Patent
Qin et al.

(10) Patent No.: US 11,128,208 B2
(45) Date of Patent: Sep. 21, 2021

(54) BRUSH MOTOR AND COOLING MODULE USING THE SAME

(71) Applicant: Johnson Electric International AG, Murten (CH)

(72) Inventors: Rui Feng Qin, Hong Kong (CN); Fei Liu, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 16 days.

(21) Appl. No.: 16/578,738

(22) Filed: Sep. 23, 2019

(65) Prior Publication Data

US 2020/0028422 A1 Jan. 23, 2020

Related U.S. Application Data

(63) Continuation-in-part of application No. 15/717,019, filed on Sep. 27, 2017, now abandoned.

(30) Foreign Application Priority Data

Sep. 27, 2016 (CN) .......................... 201610855840.5

(51) Int. Cl.
*H02K 23/08* (2006.01)
*F01P 5/04* (2006.01)
*H02K 5/14* (2006.01)
*H02K 9/06* (2006.01)
*H02K 23/38* (2006.01)
(Continued)

(52) U.S. Cl.
CPC ................ *H02K 23/38* (2013.01); *F01P 5/02* (2013.01); *F01P 5/04* (2013.01); *H02K 3/28* (2013.01); *H02K 5/148* (2013.01); *H02K 9/06* (2013.01); *F01P 2005/046* (2013.01); *H02K 2213/03* (2013.01)

(58) Field of Classification Search
CPC .......... H02K 23/38; H02K 5/148; H02K 9/06; H02K 2213/03; F01P 5/04; F01P 2005/046
USPC ................ 310/179, 195, 198, 233, 234, 235
See application file for complete search history.

(56) References Cited

U.S. PATENT DOCUMENTS

| 5,584,115 | A | * | 12/1996 | Takahashi | .............. | H01R 43/08 |
| | | | | | | 29/597 |
| 6,127,759 | A | * | 10/2000 | Tanaka | .................. | H01R 39/32 |
| | | | | | | 310/179 |

(Continued)

*Primary Examiner* — John K Kim
(74) *Attorney, Agent, or Firm* — Muncy, Geissler, Olds & Lowe, P.C.

(57) ABSTRACT

A brush motor includes a stator and a rotor. The rotor includes a rotary shaft with a rotor core and commutator fixed thereto. The commutator includes an insulating base and commutator segments fixed to the insulating base. The stator includes 2P stator poles, where P is an integer greater than 1. The rotor comprises m teeth, where 4P>m>2P, and 2m is an integral multiple of P. The rotor includes a rotor winding, which is a concentrated winding having m first elements and m second elements. Each tooth is wound with one of the first elements and one of the second elements. the m first elements form a plurality of element groups, each having n first elements connected in series, and being connected only to corresponding commutator segments at both ends thereof, where P≥n≥2. Both ends of each second element are connected to corresponding commutator segments.

14 Claims, 8 Drawing Sheets

(51) Int. Cl.
*F01P 5/02* (2006.01)
*H02K 3/28* (2006.01)

(56) References Cited

U.S. PATENT DOCUMENTS

| | | | | |
|---|---|---|---|---|
| 7,821,170 | B2* | 10/2010 | Qin | H02K 3/28 |
| | | | | 310/198 |
| 2004/0256944 | A1* | 12/2004 | Kaneko | F02N 11/00 |
| | | | | 310/233 |
| 2006/0244334 | A1* | 11/2006 | Furui | H02K 23/30 |
| | | | | 310/198 |
| 2007/0228865 | A1* | 10/2007 | Roos | H02K 23/30 |
| | | | | 310/198 |
| 2009/0058210 | A1* | 3/2009 | Qin | H02K 23/38 |
| | | | | 310/179 |
| 2010/0308681 | A1 | 12/2010 | Kawashima et al. | |
| 2011/0127871 | A1* | 6/2011 | Roos | H02K 23/38 |
| | | | | 310/177 |
| 2012/0086297 | A1* | 4/2012 | Makino | H02K 23/30 |
| | | | | 310/203 |
| 2012/0313466 | A1* | 12/2012 | Eisert | H02K 7/14 |
| | | | | 310/62 |
| 2014/0103775 | A1* | 4/2014 | Schmid | H02K 3/28 |
| | | | | 310/198 |
| 2014/0210299 | A1* | 7/2014 | Qin | H02K 3/28 |
| | | | | 310/203 |
| 2017/0222529 | A1 | 8/2017 | Ben Helal et al. | |
| 2018/0091015 | A1* | 3/2018 | Qin | H02K 5/148 |
| 2020/0028422 | A1* | 1/2020 | Qin | F01P 5/02 |

* cited by examiner

BRUSH MOTOR AND COOLING MODULE USING THE SAME

CROSS REFERENCE TO RELATED APPLICATIONS

This non-provisional patent application is a continuation-in-part of U.S. patent application Ser. No. 15/717,019, which claims priority to Patent Application No. 201610855840.5 filed in The People's Republic of China on Sep. 27, 2016.

FIELD OF THE INVENTION

The present invention relates to the electric driving field, and in particular to a cooling module that can be used to cool a car engine and a brush motor of the cooling module.

BACKGROUND OF THE INVENTION

A brush motor includes a stator and a rotor. The stator usually include a permanent magnet mounted therein to form stator poles, and the rotor includes rotor windings to cooperate with the stator poles. In particular, the rotor includes a rotary shaft, a commutator fixed to the rotary shaft, and a rotor core. The rotor core includes a plurality of teeth extending outwardly, with adjacent teeth forming therebetween wire slots. The rotor windings are wound around corresponding teeth, effective sides of which fall within the corresponding wire slot and wire terminals of which are electrically connected with commutator segments of the commutator.

A conventional motor with six stator poles and nine wire slots adopts a concentrated winding manner. Each tooth has two elements wound thereon, and there are a total of eighteen elements which form six parallel branch circuits. The shortcomings of this solution is that the wire has a very small wire diameter and there is a large number of turns of the windings, which leads to a long winding time during manufacturing of the motor, thus reducing the fabrication efficiency.

Therefore, there is a need for an improved solution.

SUMMARY OF THE INVENTION

In attempt to improve the manufacturing efficiency, a first aspect of the present invention provides a brush motor including a stator and a rotor. The rotor includes a rotary shaft with a rotor core and commutator fixed thereto. The commutator includes an insulating base and commutator segments fixed to the insulating base. The stator includes 2P stator poles, where P is an integer greater than 1. The rotor comprises m teeth, where 4P>m>2P, and 2m is an integral multiple of P. The rotor includes a rotor winding, which is a concentrated winding having m first elements and m second elements. Each tooth is wound with one of the first elements and one of the second elements. Each of the first elements are connected to no more than one of the corresponding commutator segments. The m first elements form a plurality of element groups, each having n first elements connected in series, and being connected only to corresponding commutator segments at both ends thereof, where P≥n≥2. Both ends of each second element are directly connected to corresponding commutator segments.

In another aspect, the present invention provides a cooling module comprising a fan. The cooling module further comprises a brush motor as described above.

Implementation of the present invention can reduce the total number of the turns of the rotor winding and winding time, thus improving the manufacturing efficiency and reducing the manufacturing cost of the motor.

BRIEF DESCRIPTION OF THE DRAWINGS

Advantages and implementations of the present invention will become more apparent by consideration of the embodiments described below with reference to the drawings. It should be noted that the figures are illustrative rather than limiting. In the drawings.

DETAILED DESCRIPTION OF THE PREFERRED EMBODIMENTS

Figure 1:
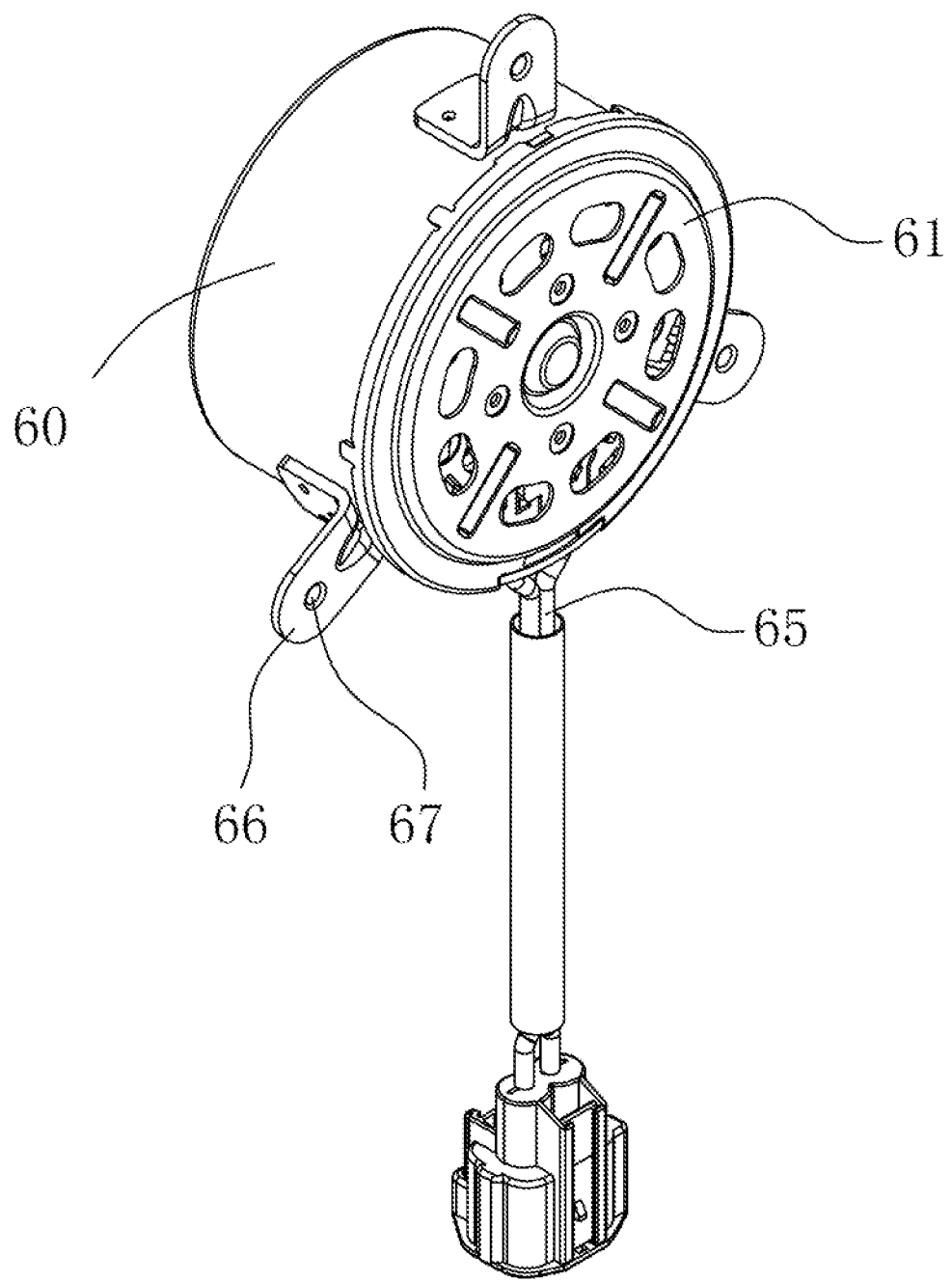
FIG. 1 illustrates a brush motor according to one embodiment of the present invention.
Figure 2:
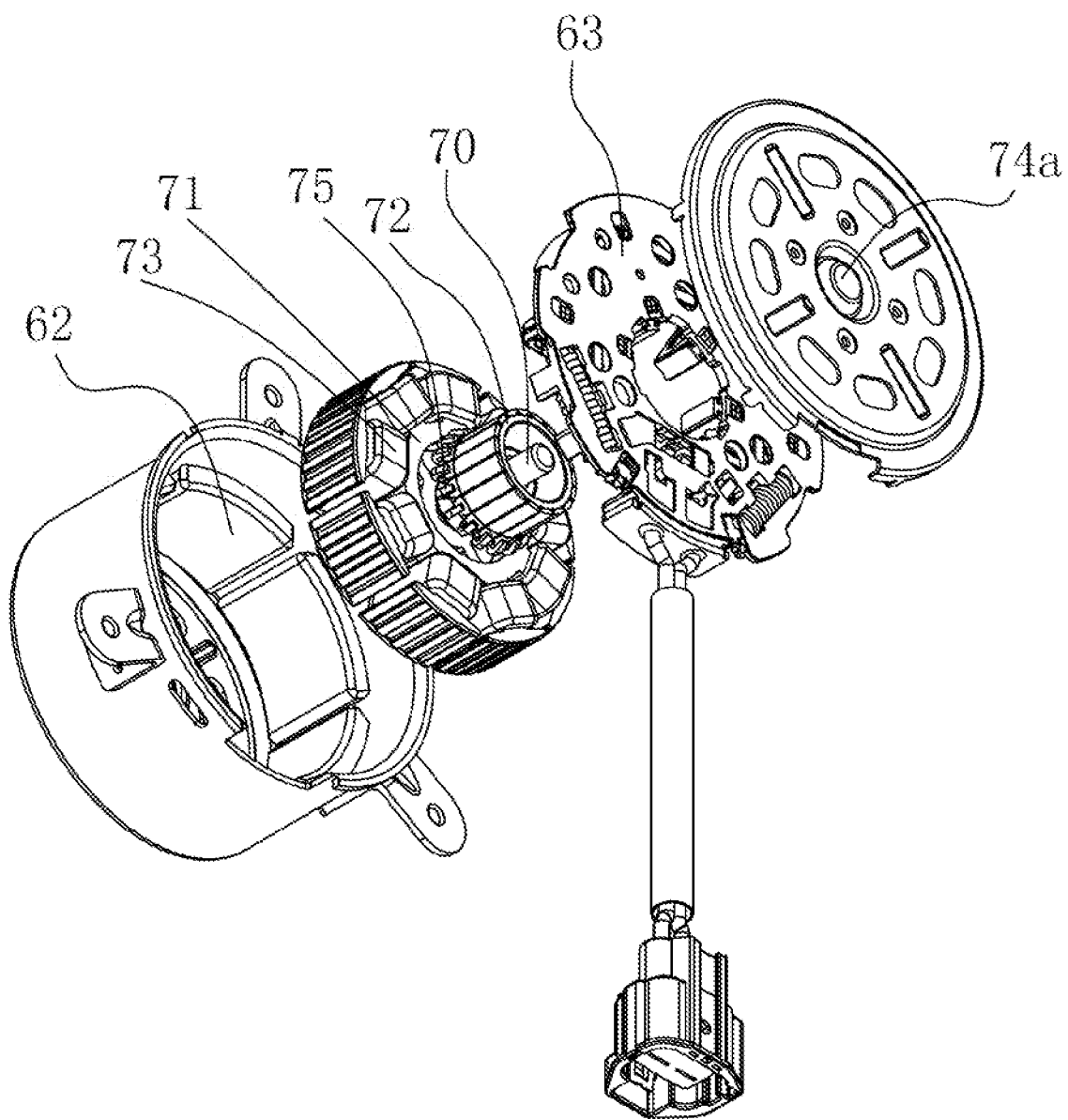
FIG. 2 is an exploded view of the brush motor of FIG. 1.
Figure 3:
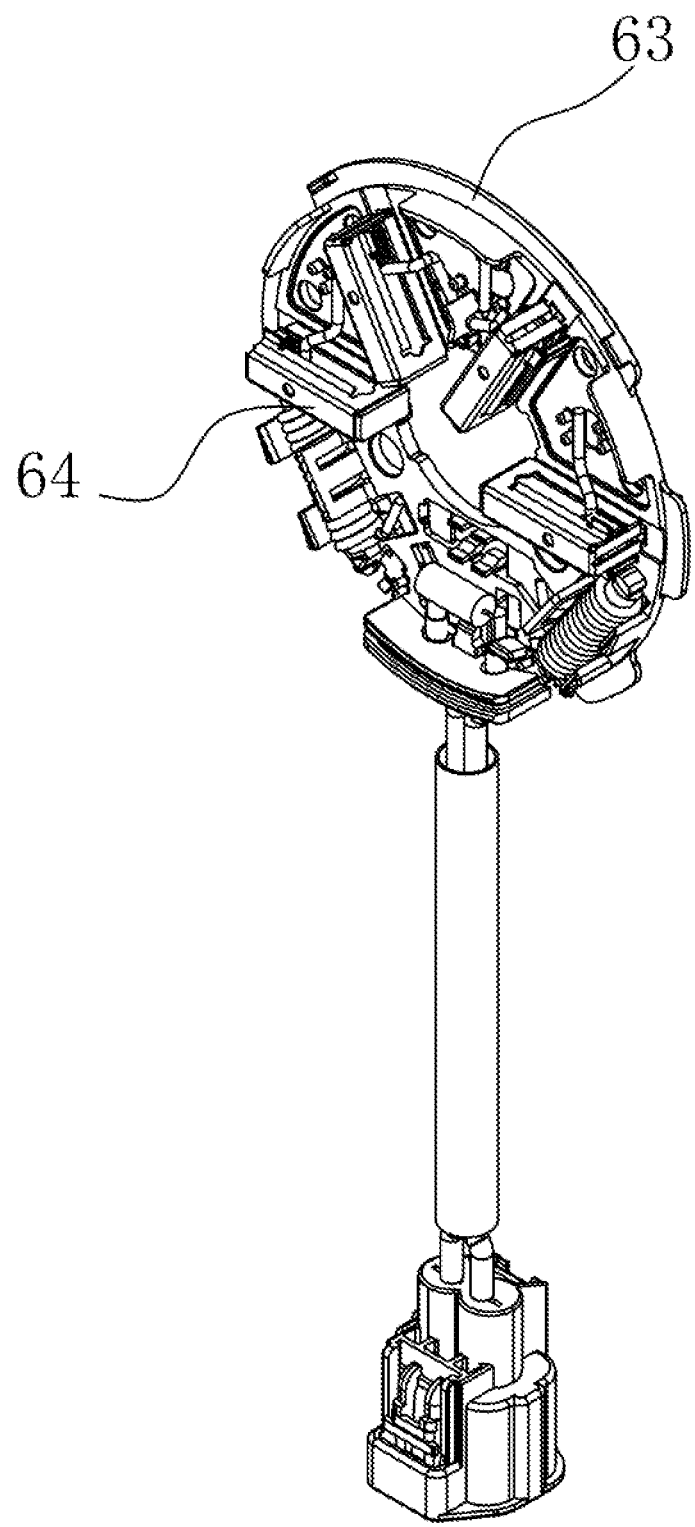
FIG. 3 illustrates a brush holder of the brush motor of FIG. 2.

Referring to FIG. 1, FIG. 2, and FIG. 3, a brush motor 100 in accordance with one embodiment of the present invention is a brush direct current motor including a stator and a rotor. The stator includes an outer housing 60, a permanent magnet 62 mounted to an inner surface of the outer housing 60, and an endcap 61 fixed to an open end of the outer housing 60. The permanent magnet 62 forms six stator poles. If P is used to denote the number of pole pairs, then P is equal to 3. L-shaped connecting portions 66 are mounted to an outer surface of the outer housing 60. Each L-shaped connecting portion 66 has a through hole 67 for allowing a fastener to pass therethrough for mounting the brush motor 100. A brush holder 63 is mounted on the endcap 61, and an electric brush 64 is mounted on the brush holder 63.

The rotor includes a rotary shaft 70, a rotor core 71 coaxially fixed to the rotary shaft 70, and a commutator 72. The rotor is mounted within the outer housing 60, and the rotary shaft 70 is supported by a bearing (not shown) mounted at a bottom of the outer housing 60 and a bearing 74a disposed in the endcap 61 so as to be able to rotate relative to the stator. A center of the bottom of the outer housing 60 defines a through hole (not shown) via which one end of the rotary shaft 70 extends out to drive an external device.

The commutator 72 includes an insulating base and a plurality of commutator segments fixed to the insulating base. The commutator segments 72 make sliding contact with the electric brush 64 so as to supply power to the commutator segments. Hooks 75 are formed at bottom ends of the commutator segments, for hooking the winding wire.

The rotor core 71 includes a plurality of teeth extending radially outwardly from the brush motor 100, and the number of the teeth is nine. If m is used to denote the number of the teeth, P is used to denote the number of the pole pairs, then m is nine, P is three, and the ratio between 2m and P is an integer. Wire slots are formed between adjacent teeth, and the nine teeth form a total of nine slots therebetween. The number of the commutator segments is twice the number of the teeth, i.e. the number of the commutator segments is 2m, i.e. eighteen.

The rotor core 71 is wound with a rotor winding 73. In this embodiment, the rotor winding 73 is wound by wires having a diameter of 0.7 mm to 0.8 mm.

Figure 4:
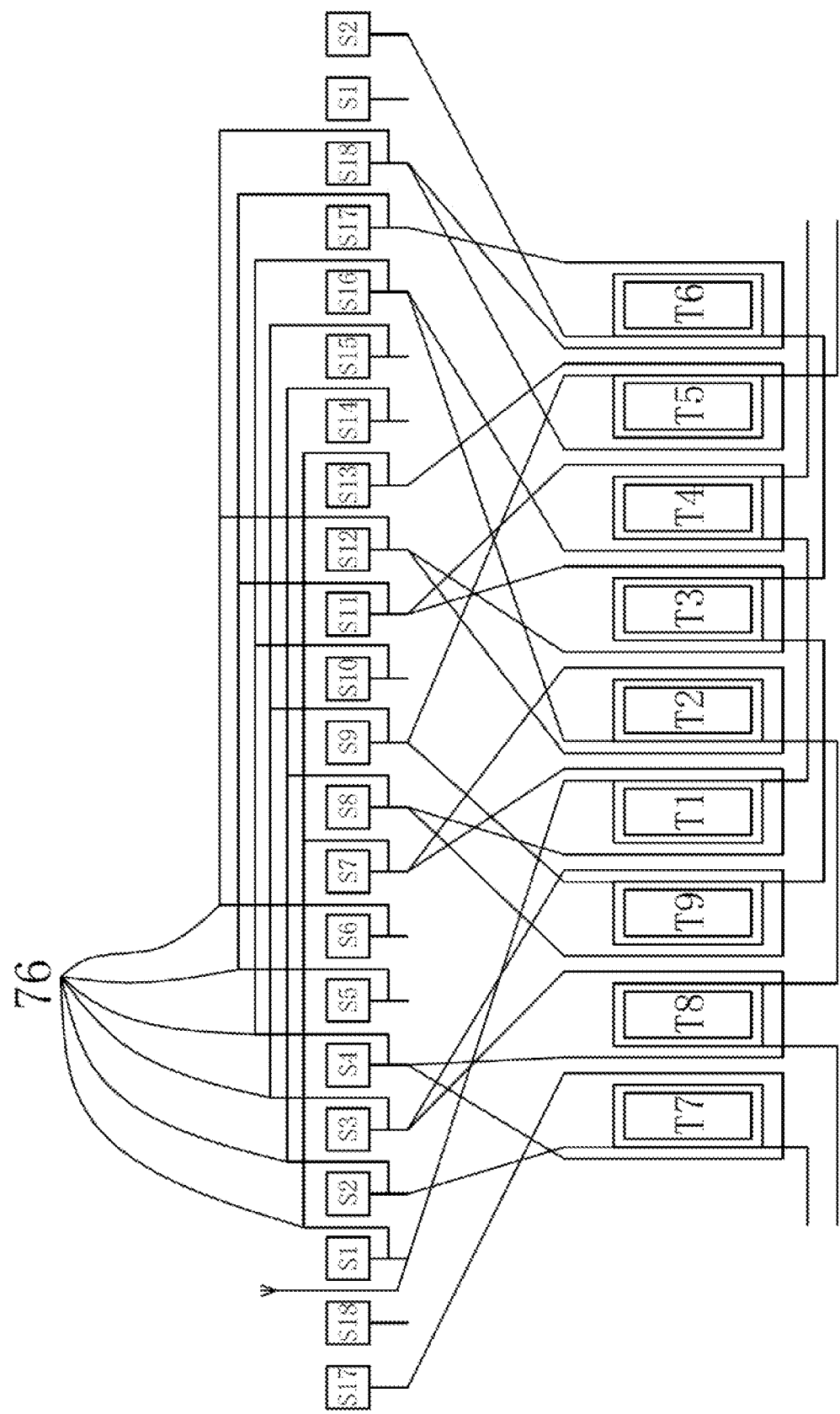
FIG. 4 is a winding scheme of the brush motor of FIG. 1 in accordance with one embodiment of the present invention.

The connection relationship of the rotor winding 73 is shown in FIG. 4. Referring to FIG. 4, the eighteen commutator segments 18 are represented by S1 to S18. For the purpose of clearer showing of the connection of the rotor winding, FIG. 4 duplicately shows the commutator segments S17, S18, S1 and S2. The nine teeth of the rotor are represented by T1 to T9.

The rotor winding 73 is a concentrated winding (each element is wound around one tooth), with each tooth wound with two elements. As such, the number of the elements is eighteen, which is twice the number of the teeth and equal to the number of the commutator segments.

Referring to FIG. 4, the commutator 72 includes six voltage equalization lines 76 each short-circuiting three commutator segments with equal potential. For example, the commutator segments S1, S7, S13 are short-circuited through one voltage equalization line 76, the commutator segments S2, S8, S14 are short-circuited through one voltage equalization line 76, the commutator segments S3, S9, S15 are short-circuited through one voltage equalization line 76, the commutator segments S4, S10, S16 are short-circuited through one voltage equalization line 76, the commutator segments S5, S11, S17 are short-circuited through one voltage equalization line 76, the commutator segments S6, S12, S18 are short-circuited through one voltage equalization line 76. It should be understood that, when the number of the commutator segments is integer (such as q) times of the pole pair number P, the commutator segments can be divided into q groups each having P commutator segments with equal potential.

Figure 5:
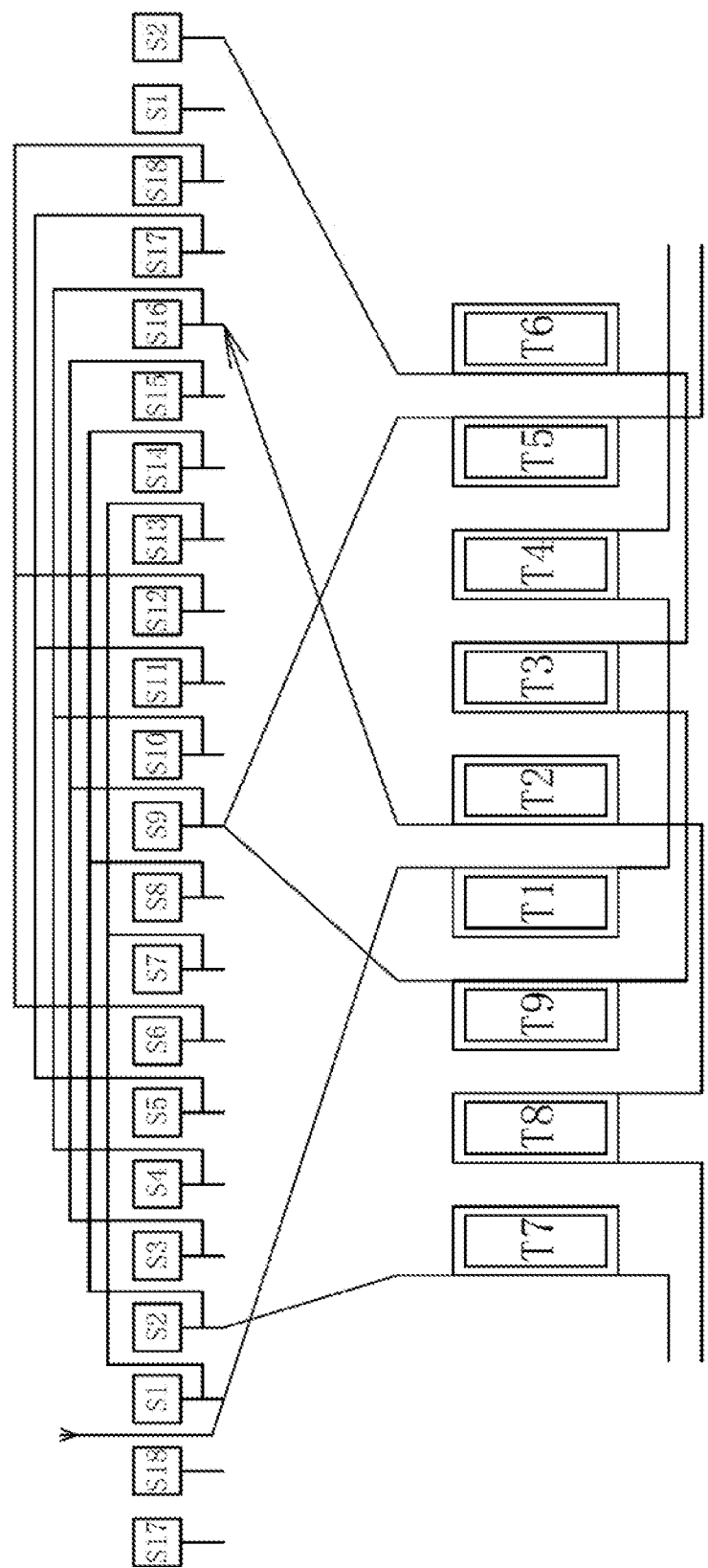
FIG. 5 is a winding scheme of a winding formed by the first elements of FIG. 4.
Figure 6:
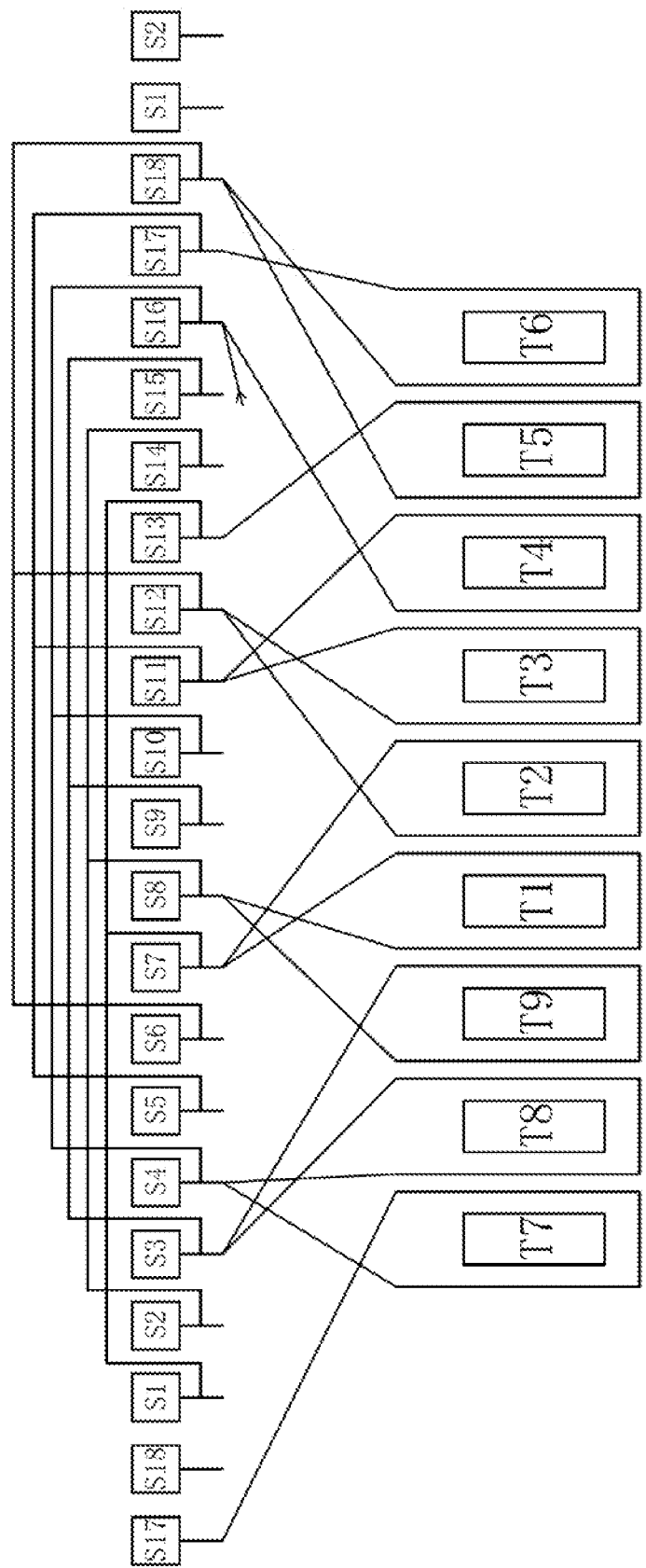
FIG. 6 is a winding scheme of a winding formed by the second elements of FIG. 4.

For the sake of easy illustration of the connection relationship of the rotor winding 73, the rotor winding 73 of FIG. 4 is split and shown in FIG. 5 and FIG. 6 in unrolled views.

Referring to FIG. 5, the wire is first hooked on one commutator segment, such as commutator segment S1. The wire extends out of the commutator segment S1 into the wire slot between the teeth T1 and T2, and is wound a plurality of turns around the tooth T1 along a clockwise direction to thereby form a first element. The wire then extends into the wire slot between the teeth T3 and T4, and is wound a plurality of turns around the tooth T4 along the clockwise direction to thereby form a second element. The wire then extends into the wire slot between the teeth T6 and T7, and is wound a plurality of turns around the tooth T7 along the clockwise direction to thereby form a third element. The wire is then hooked on the commutator segment S2. The three elements form an element group. This element group includes three series-connected elements, and only two ends of the element group are connected to two corresponding commutator segments that are not equal in potential.

Next, the wire extends out of the commutator segment S2 into the wire slot between the teeth T5 and T6, and is wound a plurality of turns around the tooth T6 along a counter-clockwise direction to thereby form a fourth element. The wire then extends into the wire slot between the teeth T3 and T4, and is wound a plurality of turns around the tooth T3 along the counter-clockwise direction to thereby form a fifth element. The wire then extends into the wire slot between the teeth T9 and T11, and is wound a plurality of turns around the tooth T9 along the counter-clockwise direction to thereby form a sixth element. The wire is then hooked on the commutator segment S9. The three elements form an element group. This element group includes three series-connected elements, and the element group are connected to two corresponding commutator segments that are not equal in potential at only two ends of the element group.

Next, the wire extends out of the commutator segment S9 into the wire slot between the teeth T5 and T6, and is wound a plurality of turns around the tooth T5 along the counter-clockwise direction to thereby form a seventh element. The wire then extends into the wire slot between the teeth T7 and T8, and is wound a plurality of turns around the tooth T8 along the clockwise direction to thereby form an eighth element. The wire then extends into the wire slot between the teeth T1 and T2, and is wound a plurality of turns around the tooth T2 along the clockwise direction to thereby form a ninth element. The wire is then hooked on the commutator segment S16. The three elements form an element group. This element group includes three series-connected elements, and the element group are connected to two corresponding commutator segments that are not equal in potential at only two ends of the element group.

As such, each element group includes three series-connected elements, and the two ends of each element group are only connected to the corresponding two commutator segments. The winding process of the elements of FIG. 5 may be shown in the table below.

TABLE 1 winding table illustrating the connection relationship between the teeth, the commutator and the elements of FIG 5.

| Commutator segment (Hooked) | Teeth being wound | Teeth being wound | Teeth being wound | Commutator segment (Hooked) |
| --- | --- | --- | --- | --- |
| S1 | T1 | T4 | T7 | S2 |
| S2 | T6 | T3 | T9 | S9 |
| S9 | T5 | T8 | T2 | S16 |

Referring to FIG. 6, the wire then extends out of the commutator segment S16 into the wire slot between the teeth T3 and T4, is wound a plurality of turns around the tooth T4 along the counter-clockwise direction to thereby form a tenth element, and is then hooked on the commutator segment S11.

The wire then extends out of the commutator segment S11 into the wire slot between the teeth T3 and T4, is wound a plurality of turns around the tooth T3 along the clockwise direction to thereby form an eleventh element, and is then hooked on the commutator segment S12.

The wire then extends out of the commutator segment S12 into the wire slot between the teeth T1 and T2, is wound a plurality of turns around the tooth T2 along the counter-clockwise direction to thereby form a twelveth element, and is then hooked on the commutator segment S7.

The wire then extends out of the commutator segment S7 into the wire slot between the teeth T1 and T2, is wound a plurality of turns around the tooth T1 along the clockwise direction to thereby form a thirteenth element, and is then hooked on the commutator segment S8.

The wire then extends out of the commutator segment S8 into the wire slot between the teeth T8 and T9, is wound a plurality of turns around the tooth T9 along the counter-clockwise direction to thereby form a fourteenth element, and is then hooked on the commutator segment S3.

The wire then extends out of the commutator segment S3 into the wire slot between the teeth T8 and T9, is wound a plurality of turns around the tooth T8 along the clockwise direction to thereby form a fifteenth element, and is then hooked on the commutator segment S4.

The wire then extends out of the commutator segment S4 into the wire slot between the teeth T6 and T7, is wound a plurality of turns around the tooth T7 along the counter-clockwise direction to thereby form a sixteenth element, and is then hooked on the commutator segment S17.

The wire then extends out of the commutator segment S17 into the wire slot between the teeth T6 and T7, is wound a plurality of turns around the tooth T6 along the clockwise direction to thereby form a seventeenth element, and is then hooked on the commutator segment S18.

The wire then extends out of the commutator segment S18 into the wire slot between the teeth T4 and T5, is wound a plurality of turns around the tooth T5 along the counter-clockwise direction to thereby form an eighteenth element, and is then hooked on the commutator segment S13.

Because the commutator segment S13 and the commutator segment S1 are short-circuited through the voltage equalization line 76, the eighteen elements wound by the wire form a closed loop.

The winding process of the elements of FIG. 6 may be shown in the table below.

TABLE 2 winding table illustrating the connection relationship between the teeth, the commutator and the elements of FIG. 6.

| Commutator segment (Hooked) | Teeth being wound | Commutator segment (Hooked) | Teeth being wound | Commutator segment (Hooked) | Teeth being wound | Commutator segment (Hooked) |
|---|---|---|---|---|---|---|
| S16 | T4 | S11 | T3 | S12 | T2 | S7 |
| S7 | T1 | S8 | T9 | S3 | T8 | S4 |
| S4 | T7 | S17 | T6 | S18 | T5 | S13 |

A combination of the windings of FIG. 5 and FIG. 6 results in the rotor winding 73 of FIG. 4. Understandably, two wires may be used to winding the windings of FIG. 5 and FIG. 6, respectively, or alternatively a single wire can be used to continuously wind the windings of FIG. 5 and FIG. 6. The winding of FIG. 5 can be wound prior to winding the winding of FIG. 6, or alternatively the winding of FIG. 6 can be wound prior to winding the winding of the FIG. 5.

If the winding of FIG. 5 is first wound, the winding of FIG. 5 forms a first winding layer of the rotor winding 73, and the winding of FIG. 6 forms a second winding layer of the rotor winding 73 which is disposed outside the first winding layer. Understandably, if the winding of FIG. 6 is first wound, the winding of FIG. 6 forms a first winding layer of the rotor winding 73, and the winding of FIG. 5 forms a second winding layer of the rotor winding 73 which is disposed outside the first winding layer.

For ease of description, the elements of FIG. 5 are referred to as first winding elements, and the elements of FIG. 6 are referred to as second winding elements. As such, the rotor winding 73 has a total of nine first winding elements, which are the first element to the ninth element as described above, and nine second winding elements, which are the tenth element to the eighteenth element as described above. Each tooth is wound with one first winding element and one second winding element.

Because each tooth is wound with one first winding element and one second winding element, for a motor with m (m is an integer greater than 2P and less than 4P, where 2m is an integral multiple of P) teeth, the rotor winding includes m first winding elements and m second winding elements. The m first winding elements form a plurality of element groups each having n (n is an integer no less than 2 and no greater than P) series-connected first winding elements, and each element group connects to two corresponding commutator segments at only two ends of the element group. Two ends of each second winding element are directly connected with corresponding commutator segments, i.e. the ends of one of the second winding elements are connected to the corresponding commutator segments via no any other winding element. When the commutator 72 has 2m commutator segments, the commutator 72 has 2m/P voltage equalization lines each short-circuiting P commutator segments with equal potential. As such, an equivalent circuit formed by the rotor winding 73 has 2(P-1) parallel branch circuits, with one branch circuit formed by the series-connected m first winding elements, the remaining branch circuits formed by the m second winding elements and each of the remaining branch circuits having series-connected n second winding elements.

In the following, the equivalent circuit is described in detail in connection with the embodiment of FIG. 1 to FIG. 4 (P is three, m is nine, and n is 3).

Figure 7:
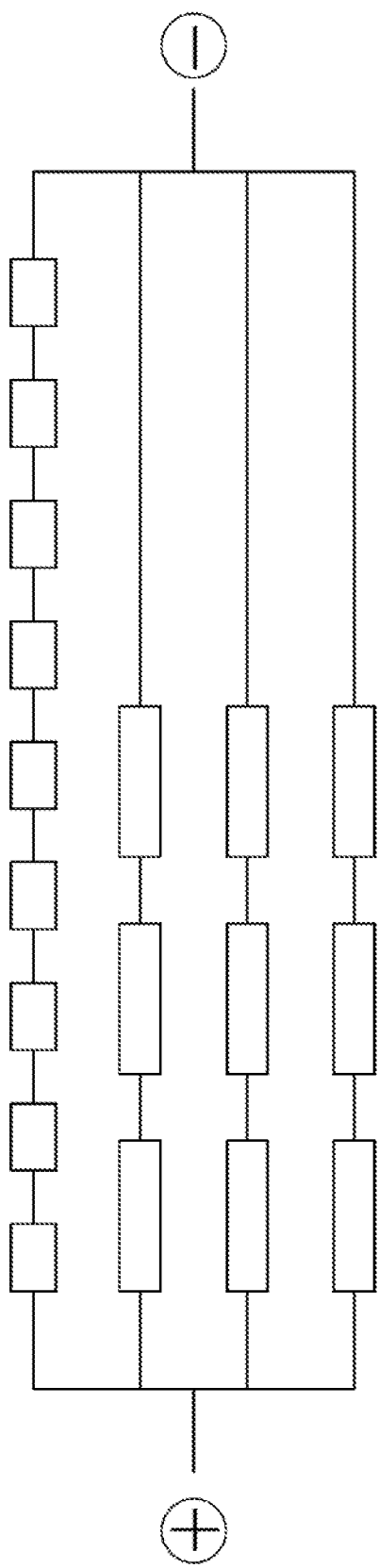
FIG. 7 illustrates an equivalent circuit formed by the rotor winding of FIG. 4.

Referring FIG. 7, the rotor winding 73 forms an equivalent circuit having four parallel branch circuits. The first row represents a first parallel branch circuit having series-connected nine first winding elements (as shown in FIG. 5). The second, third and fourth rows represent the other three parallel branch circuits formed by nine second winding elements (as shown in FIG. 6), with each parallel branch circuit having three series-connected second winding elements.

Preferably, each parallel branch circuit has the same total number of turns to balance the currents through the respective parallel branch circuits. The number of the series-connected winding elements of the first parallel branch circuit is three times of the number of the series-connected winding elements of the second parallel branch circuit. Therefore, the number of turns of each second winding element is preferably three times of the number of turns of first winding element.

Understandably, for the rotor winding 73 having m first winding elements and m second winding elements, if the m first winding elements form a plurality of element groups (each element group connects to the corresponding commutator segments at two ends of the element group) each having n series-connected first elements (n is an integer greater than 2 and less than P), The number of turns of each second winding element is m/n times of the number of turns of each first winding element.

As described above, the rotor winding 73 of this embodiment forms four parallel branch circuits, which are two less than the six branch circuits of the conventional solution. The number of turns of the first winding element is less than the number of turns of the second winding element. Therefore, the total number of the turns is reduced, which reduces the winding time and hence improves the fabrication efficiency.

Figure 8:
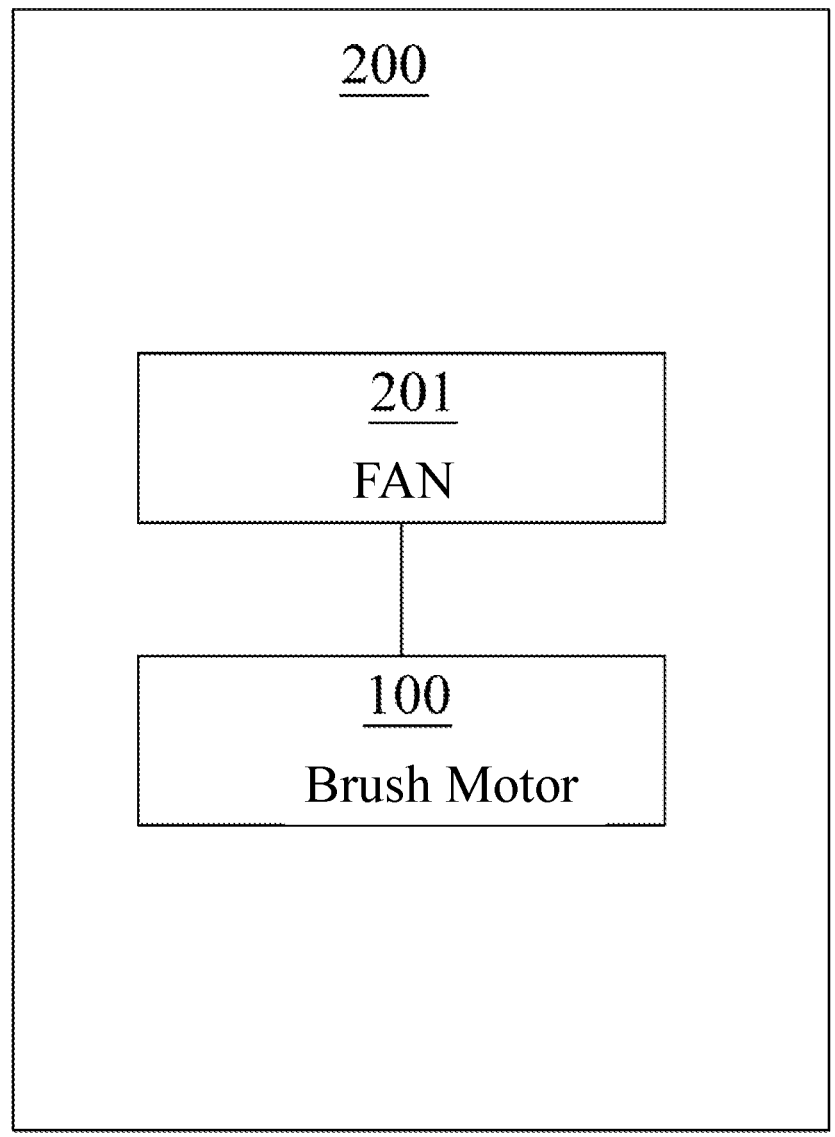
FIG. 8 illustrates a cooling module provided by the present invention.

FIG. 8 illustrates a cooling module 200 according to one embodiment of the present invention. The cooling module 200 includes a fan 201 and a brush motor 100. The fan 201 is directly driven by a rotor of the brush motor 100. In this embodiment, the cooling module 200 is a car engine cooling module.

Although the invention is described with reference to one or more embodiments, the above description of the embodiments is used only to enable people skilled in the art to practice or use the invention. It should be appreciated by those skilled in the art that various modifications are possible without departing from the spirit or scope of the present invention. The embodiments illustrated herein should not be interpreted as limits to the present invention, and the scope of the invention is to be determined by reference to the claims that follow.

The invention claimed is:

1. A brush motor comprising:
a stator comprising 2P stator poles, wherein P is an integer greater than 1; and
a rotor comprising a rotary shaft, and a rotor core and a commutator fixed to the rotary shaft, the commutator comprising an insulating base and a plurality of commutator segments fixed to the insulating base,
wherein the rotor comprises m teeth, wherein m is an integer greater than 2P less than 4P, and 2m is an integral multiple of P;
wherein the rotor comprises a rotor winding, which is a concentrated winding having m first winding elements and m second winding elements, and each tooth is wound with one of the first winding elements and one of the second winding elements;
wherein each of the first winding elements is directly connected to no more than one of the corresponding commutator segments, the m first winding elements form a plurality of element groups, each element group having n first winding elements connected in series without any one of the commutator segments connected between any two of the first winding elements in the corresponding element group, each element group being connected only to corresponding commutator segments at both ends thereof, where n is greater than or equal to 2 and less than or equal to P; and
wherein both ends of each second winding element are directly connected to corresponding commutator segments.

2. The brush motor of claim 1, wherein a number of turns of each second winding element is m/n times of a number of the turns of each first winding element.

3. The brush motor of claim 1, wherein said m first winding elements are continuously formed by a single wire.

4. The brush motor of claim 1, wherein them second winding elements are continuously formed by a single wire.

5. The brush motor of claim 1, wherein the m first winding elements and the m second winding elements are formed by a single wire.

6. The brush motor of claim 1, wherein the rotor winding forms a first winding layer and a second winding layer disposed outside the first winding layer; the m first winding elements are located in one same winding layer, and the m second winding elements are located in another same winding layer.

7. The brush motor of claim 1, wherein the rotor winding forms 2*(P-1) parallel branch circuits, one or two parallel branch circuits are formed by the m first winding elements, and the remaining parallel branch circuits are formed by the m second winding elements.

8. The brush motor of claim 1, wherein P is three, m is nine, n is three, the stator has six stator poles, the rotor has nine teeth, and the rotor winding has nine first winding elements and nine second winding elements.

9. The brush motor of claim 8, wherein the rotor winding forms four parallel branch circuits, one of the four branch circuits is formed by the nine first winding elements, the nine second winding elements form the other three parallel branch circuits, each having three of the second winding elements connected in series.

10. The brush motor of claim 1, wherein a number of the commutator segments is twice the number of the teeth.

11. The brush motor of claim 10, wherein the commutator has a plurality of voltage equalization lines each short-circuiting P of the commutator segments with equal potential.

12. The brush motor of claim 1, wherein the rotor winding is formed by a wire having a diameter of 0.7 mm to 0.8 mm.

13. A cooling module comprising a fan, wherein the cooling module further comprises a brush motor in accordance with claim 1.

14. The cooling module of claim 13, wherein the cooling module is a car engine cooling module, and the fan is directly driven by the rotor.

* * * * *